United States Patent
Adachi

(10) Patent No.: US 12,253,765 B2
(45) Date of Patent: Mar. 18, 2025

(54) LIQUID CRYSTAL DISPLAY DEVICE

(71) Applicant: Japan Display Inc., Tokyo (JP)

(72) Inventor: Koichiro Adachi, Tokyo (JP)

(73) Assignee: Japan Display Inc., Tokyo (JP)

(*) Notice: Subject to any disclaimer, the term of this patent is extended or adjusted under 35 U.S.C. 154(b) by 77 days.

(21) Appl. No.: 18/122,858

(22) Filed: Mar. 17, 2023

(65) Prior Publication Data

US 2023/0314880 A1  Oct. 5, 2023

(51) Int. Cl.
*G02F 1/1343* (2006.01)
*G02F 1/1335* (2006.01)
*G02F 1/1339* (2006.01)
*G09G 3/34* (2006.01)
*G09G 3/36* (2006.01)
*G02F 1/1362* (2006.01)

(52) U.S. Cl.
CPC .. *G02F 1/134336* (2013.01); *G02F 1/133553* (2013.01); *G02F 1/1339* (2013.01); *G02F 1/13439* (2013.01); *G09G 3/3406* (2013.01); *G09G 3/36* (2013.01); *G02F 1/136227* (2013.01); *G09G 2320/02* (2013.01); *G09G 2330/021* (2013.01)

(58) Field of Classification Search
CPC ................................................ G02F 1/134336
See application file for complete search history.

(56) References Cited

U.S. PATENT DOCUMENTS

| | | | | |
|---|---|---|---|---|
| 2004/0196417 A1* | 10/2004 | Okazaki | ............ | G02F 1/133707 349/111 |
| 2012/0313906 A1 | 12/2012 | Tamaki et al. | | |
| 2015/0009467 A1* | 1/2015 | Daishi | .................. | G02F 1/1368 349/146 |
| 2019/0056619 A1* | 2/2019 | Umeda | ............. | G02F 1/133514 |
| 2020/0226996 A1* | 7/2020 | Nakao | .................. | G09G 3/3688 |

FOREIGN PATENT DOCUMENTS

JP   2012-255908 A   12/2012

* cited by examiner

Primary Examiner — Edmond C Lau
(74) Attorney, Agent, or Firm — K&L Gates LLP

(57) ABSTRACT

A liquid crystal display device includes an array substrate including a pixel array with a plurality of pixel electrodes arranged in a matrix, and a counter substrate including a counter electrode opposed to the array substrate and overlapping the plurality of pixel electrodes. The counter electrode includes openings in regions overlapping each of the pixel electrodes, and the plurality of pixel electrodes includes four pixel electrodes adjacent each other, and edges of the four pixel electrodes have an edge shape that diagonally faces each other and widens a spacing between the four pixel electrodes.

7 Claims, 9 Drawing Sheets

LIQUID CRYSTAL DISPLAY DEVICE

CROSS-REFERENCE TO RELATED APPLICATIONS

This application claims the benefit of priority to Japanese Patent Application No. 2022-058217, filed on Mar. 31, 2022, the entire contents of which are incorporated herein by reference.

FIELD

An embodiment of the present invention relates to the structure of pixels of a liquid crystal display device.

BACKGROUND

There are two types of liquid crystal displays: one is a transmissive type that transmits light from the backlight and displays images, and other is a reflective type that reflects outside light back to the pixel electrodes and displays images. Also known are types of liquid crystal displays that combine reflective and transmissive configurations. For example, there is disclosed a semi-transmissive liquid crystal display device that has reflective electrodes and transmits light from a backlight by using the region between pixels in which reflective electrodes are arranged as a transmissive region (for example, Japanese Patent Laid-Open No. 2012-255908).

The liquid crystal display device disclosed in Japanese Patent Laid-Open No. 2012-255908 does not only reflect external light with reflective electrodes but also assists the display at the reflective electrodes by transmitting light from the backlight through the gaps between the reflective electrodes, whereby the luminance of the displayed image on the liquid crystal display is maintained above a certain level regardless of the surrounding environment. Although the contrast of the liquid crystal display is improved by adopting the normally black mode as the display mode, further improvement of image quality is required.

SUMMARY

A liquid crystal display device in an embodiment according to the present invention includes an array substrate including a pixel array with a plurality of pixel electrodes arranged in a matrix, and a counter substrate including a counter electrode opposed to the array substrate and overlapping the plurality of pixel electrodes. The counter electrode has openings in regions overlapping each of the pixel electrodes, and the plurality of pixel electrodes includes four pixel electrodes adjacent each other, and edges of the four pixel electrodes have an edge shape that diagonally faces each other and widens a spacing between the four pixel electrodes.

A liquid crystal display device in an embodiment according to the present invention includes an array substrate including a pixel array arranged in a matrix of a plurality of pixel electrodes, and a counter substrate including a counter electrode facing the array substrate and overlapping the plurality of pixel electrodes. The counter electrode has openings in a region overlapping each of the plurality of pixel electrodes, and each of the plurality of pixel electrodes includes at least one notch in a center portion of an outer edge so that a distance between adjacent pixel electrodes is partially widened.

A liquid crystal display device in an embodiment according to the present invention includes an array substrate including a pixel array arranged in a matrix of a plurality of pixel electrodes, and a counter substrate including a counter electrode facing the array substrate and overlapping the plurality of pixel electrodes. The counter electrode has slits in regions overlapping each of the plurality of pixel electrodes, and the slits have a pattern extending from the center to an outer edge of each of the plurality of pixel electrodes in a plan view.

DESCRIPTION OF EMBODIMENTS

Hereinafter, embodiments of the present invention are described with reference to the drawings. However, the present invention can be implemented in many different aspects, and should not be construed as being limited to the description of the following embodiment. For the sake of clarifying the explanation, the drawings may be expressed schematically with respect to the width, thickness, shape, and the like of each part compared to the actual aspect, but this is only an example and does not limit the interpretation of the present invention. For this specification and each drawing, elements similar to those described previously with respect to the previous drawing may be given the same reference sign (or a number followed by a, b, etc.) and a detailed description may be omitted as appropriate. The terms "first" and "second" appended to each element are a convenience sign used to distinguish them and have no further meaning except as otherwise explained.

As used herein, where a member or region is "on" (or "below") another member or region, this includes cases where it is not only directly on (or just under) the other member or region but also above (or below) the other member or region, unless otherwise specified. That is, it includes the case where another component is included in between above (or below) other members or regions.

Structure of Liquid Crystal Display Device

The present embodiment discloses, as an example, a MIP (Memory in Pixel) type liquid crystal display device that includes a memory circuit for storing data in each pixel.

Figure 1:
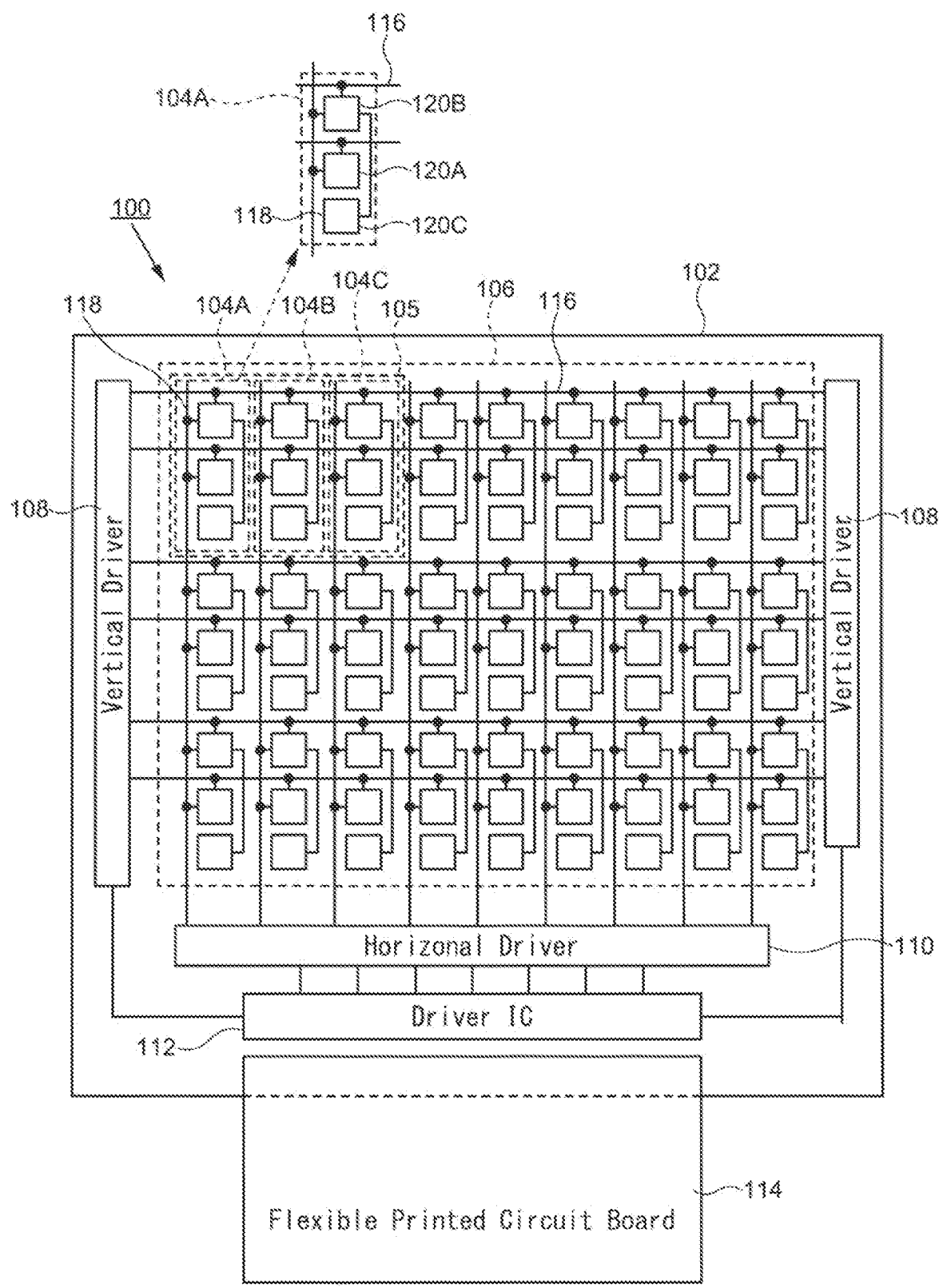
FIG. 1 is a configuration of a liquid crystal display device according to an embodiment of the present invention.

FIG. 1 shows the configuration of a liquid crystal display device 100. The liquid crystal display device 100 includes a pixel array 106 in which pixels 105 are arranged. The pixel array 106 is arranged, for example, on a transparent glass substrate. In this embodiment, the array substrate 102 refers to the substrate on which the pixel array 106 is arranged. The array substrate 102 is arranged with a drive circuit to drive the pixel array 106. The drive circuit includes a vertical driver 108, a horizontal driver 110 and a driver IC 112. These drive circuits are arranged on the array substrate 102 in the region outside the pixel array 106.

The pixel array 106 is arranged with an arbitrary number (m rows and n columns) of pixels 105 in a matrix in the row and column directions. The pixel array 106 has a plurality of scanning signal lines 116 extending in the row direction and a plurality of data signal lines 118 extending in the column direction, corresponding to the array of pixels 105.

The pixel 105 includes a plurality of sub-pixels. FIG. 1 shows an aspect in which a pixel 105 includes a first sub-pixel 104A, a second sub-pixel 104B, and a third sub-pixel 104C. As described later, the liquid crystal display device 100 displays images in area gradations, so that one sub-pixel includes a plurality of pixel electrodes. FIG. 1 shows that the first sub-pixel 104A includes a first pixel electrode 120A, a second pixel electrode 120B, and a third pixel electrode 120C. The second sub-pixel 104B and the third sub-pixel 104C also have a similar configuration.

The vertical driver 108 outputs scanning signals to the scanning signal lines 116 arranged in the pixel array 106. The pixels 105 arranged in the pixel array 106 are selected row by row, and each sub-pixel 104A, sub-pixel 104B, and sub-pixel 104C of the selected pixel 105 is in the signal write state, and data signals (video signals) are written from the data signal line 118. The vertical driver 108 operates to sequentially output selection pulses to a plurality of scanning signal lines 116, so that data signals are written every one frame. The vertical driver 108 can also operate to rewrite the data of the pixel 105 assigned to a specific area by addressing it in row units. FIG. 1 shows a configuration in which the vertical driver 108 is arranged on both sides of the pixel array 106, but this arrangement is not limited to this example, and the vertical driver 108 may be arranged only on either the left or right side of the pixel array 106.

The horizontal driver 110 outputs data signals output from the driver IC 112 to the data signal lines 118. The horizontal driver 110 includes a multiplexer circuit and selects the plurality of data signal lines 118 and outputs data signals. Various methods can be selected as the writing method of data signals by the horizontal driver 110, such as the line sequential method, which writes data signals simultaneously to the plurality of pixels 105 lined up in the row selected by the vertical driver 108, and the point sequential method, which writes data signals one by one in sequence in pixel units in the plurality of pixels 105 lined up in the selected row.

The driver IC 112 is, for example, made of a semiconductor integrated circuit and mounted on the array substrate 102. For example, the driver IC 112 may be mounted on the array substrate 102 in a COG (Chip on Glass) method or mounted on the flexible printed circuit board 114 in a COF (Chip on Film) method as shown. The driver IC 112 outputs data signals for displaying images to the horizontal driver 110, and outputs timing signals to the vertical driver 108 to synchronize with the data signals.

The flexible printed circuit board 114 is connected to the array substrate 102. The data signals and control signals input to the driver IC 112 are input from an external controller (not shown) via the flexible printed circuit board 114.

Figure 2:
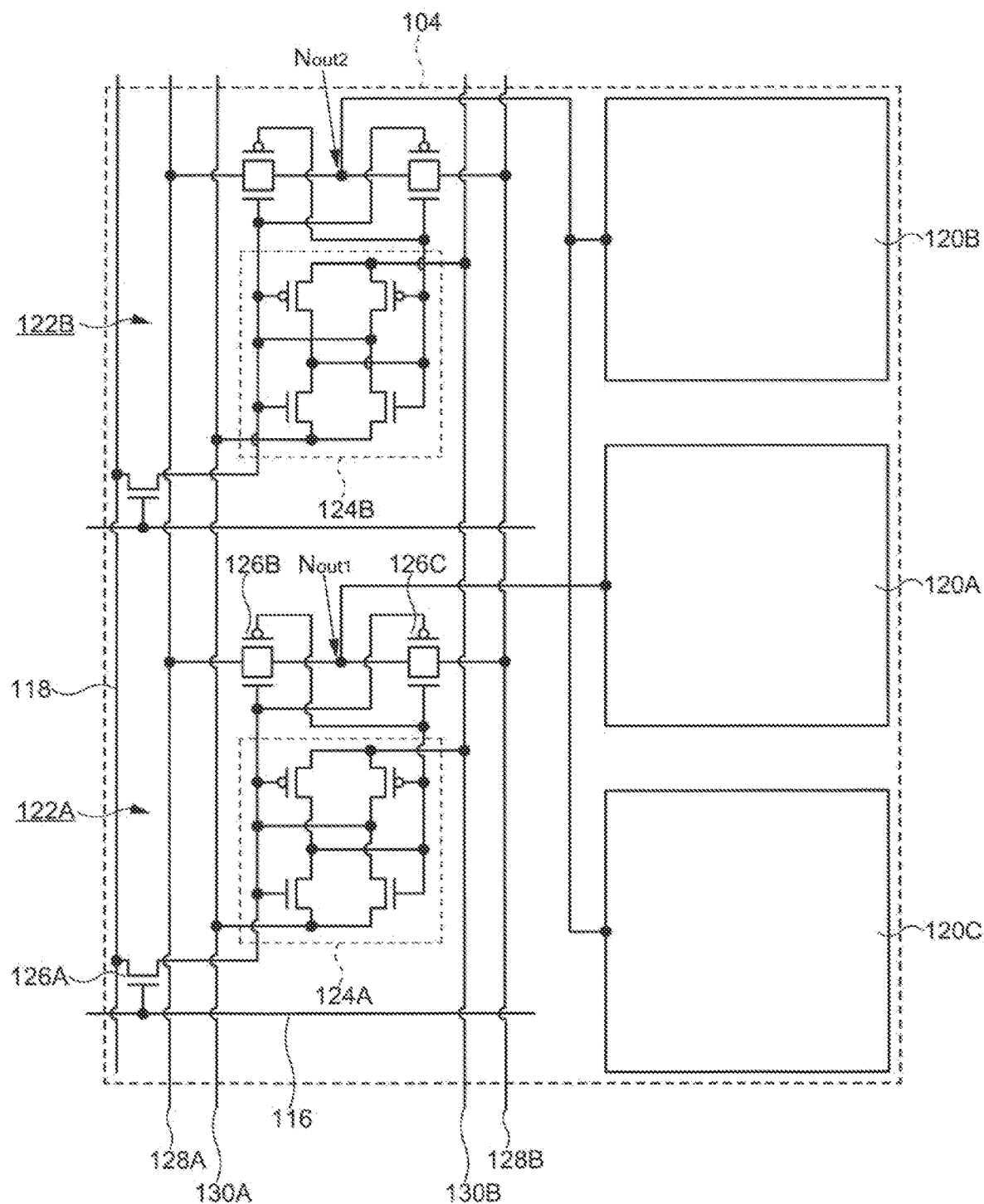
FIG. 2 is a pixel circuit of a liquid crystal display and a pixel electrode connected to the pixel circuit according to an embodiment of the present invention.

FIG. 2 shows the first sub-pixel circuit 122A and the second sub-pixel circuit 122B included in the sub-pixel 104, the first pixel electrode 120A connected to the first sub-pixel circuit 122A, the second pixel electrode 120B connected to the second sub-pixel circuit 122B and the third pixel electrode 120C. The liquid crystal display device 100 according to the present embodiment is mainly a reflective display device, and the first pixel electrode 120A, the second pixel electrode 120B and the third pixel electrode 120C are reflective electrodes. The liquid crystal display device 100 is a gradation display device that represents gradation by the area gradation method, in which the first pixel electrode 120A, second pixel electrode 120B, and third pixel electrode 120C are area-weighted by the first pixel electrode 120A, second pixel electrode 120B and third pixel electrode 120C.

FIG. 2 shows an example of the sub-pixel 104 applicable to area gradation. The sub-pixel 104 includes the first pixel electrode 120A, the second pixel electrode 120B and the third pixel electrode 120C having the same area. The sub-pixel 104 has the first pixel electrode 120A in the center and the second pixel electrode 120B and the third pixel electrode 120C on both sides (above and below when viewed in the column direction).

The sub-pixel 104 includes a first sub-pixel circuit 122A and the second sub-pixel circuit 122B. The first sub-pixel circuit 122A is connected to the first pixel electrode 120A, while the second sub-pixel circuit 122B is connected to the second pixel electrode 120B and the third pixel electrode 120C. That is, the same drive voltage is applied to the second pixel electrode 120B and the third pixel electrode 120C. In this way, the area ratio of the sub-pixel 104 is weighted to the area of the first pixel electrode 120A, with the second pixel electrode 120B and the third pixel electrode 120C as a pair of pixel electrodes to which a voltage is applied, resulting in a pixel electrode area ratio of 1:2.

The first sub-pixel circuit 122A is configured to apply the drive voltage to the first pixel electrode 120A, while the second sub-pixel circuit 122B applies the drive voltage to the second pixel electrode 120B and the third pixel electrode 120C, as such, although the first sub-pixel circuit 122A is divided into three pixel electrodes, the sub-pixel 104 can be regarded as substantially having two pixel electrodes with different areas. Each pixel electrode of each sub-pixel 104A, sub-pixel 104B, and sub-pixel 104C included in the pixel 105 is arranged so that the first pixel electrode 120A is arranged in the center and the second pixel electrode 120B and the third pixel electrode 120C are arranged on both sides. This arrangement enables the center of gravity of each tone with respect to the center of gravity of one pixel to be aligned.

As shown in FIG. 2, the first sub-pixel circuit 122A includes a first switching element 126A, a second switching element 126B, a third switching element 126C, and a first latch circuit 124A. The first switching element 126A is, for example, a thin-film transistor, a gate is connected to the scanning signal line 116, and one of the input/output terminals consisting of a source and a drain is connected to the data signal line 118. When a scanning signal is applied to the gate from the scanning signal line 116, the first switching element 126A is turned on and the data signal is input to the first latch circuit 124A from the data signal line 118. The output signal of the first latch circuit 124A controls the on/off state of the second and third switching elements 126B, 126C. The second switching element 126B is arranged between the first control signal line 128A, in which a control signal of the same polarity as the voltage of the counter electrode 138 (refer to FIG. 3) is applied, and the output node Nout1 of the first pixel circuit 122A. The third switching element 126C is arranged between the second control signal line 128B, in which a control signal of the opposite phase of the first control signal line 128A is applied. and the output node Nout1. The first latch circuit 124A is connected to the first power line 130A. in which a high potential power supply voltage is applied. and the second power line 130B in which a low potential power supply voltage is applied.

One of the second switching element 126B and the third switching element 126C is turned on and the other is turned off according to the polarity of the voltage held by the first latch circuit 124A. One input/output terminal of the second switching element 126B is connected to one input/output terminal of the third switching element 126C, and the node is the output node Nout1 of the first sub-pixel circuit 122A, which is connected to the first pixel electrode 120A.

The liquid crystal display device 100 according to the present embodiment is applied with a vertically aligned (VA: Vertical Alignment) liquid crystal, the counter electrode 138 (refer to FIG. 3) is arranged to face the first pixel electrode 120A, the second pixel electrode 120B, and the third pixel electrode 120C with the liquid crystal layer in between. When a predetermined common voltage is applied to the counter electrode 138, a voltage of the same polarity as or opposite polarity to the common voltage is applied to the first pixel electrode 120A from the first sub-pixel circuit 122A as the above drive voltage. In other words, a voltage of the same polarity or the opposite polarity as the common voltage is output from output node Nout1 by turning on one of the second switching element 126B and the third switching element 126C according to the voltage based on the data signal held by the first latch circuit 124A.

The second sub-pixel circuit 122B includes the same circuit configuration as the first sub-pixel circuit 122A and operates in the same method. The output node Nout2 of the second sub-pixel circuit 122B is connected to the second pixel electrode 120B and the third pixel electrode 120C and outputs a voltage of the same polarity or opposite polarity as the common voltage to these two pixel electrodes.

Figure 3:
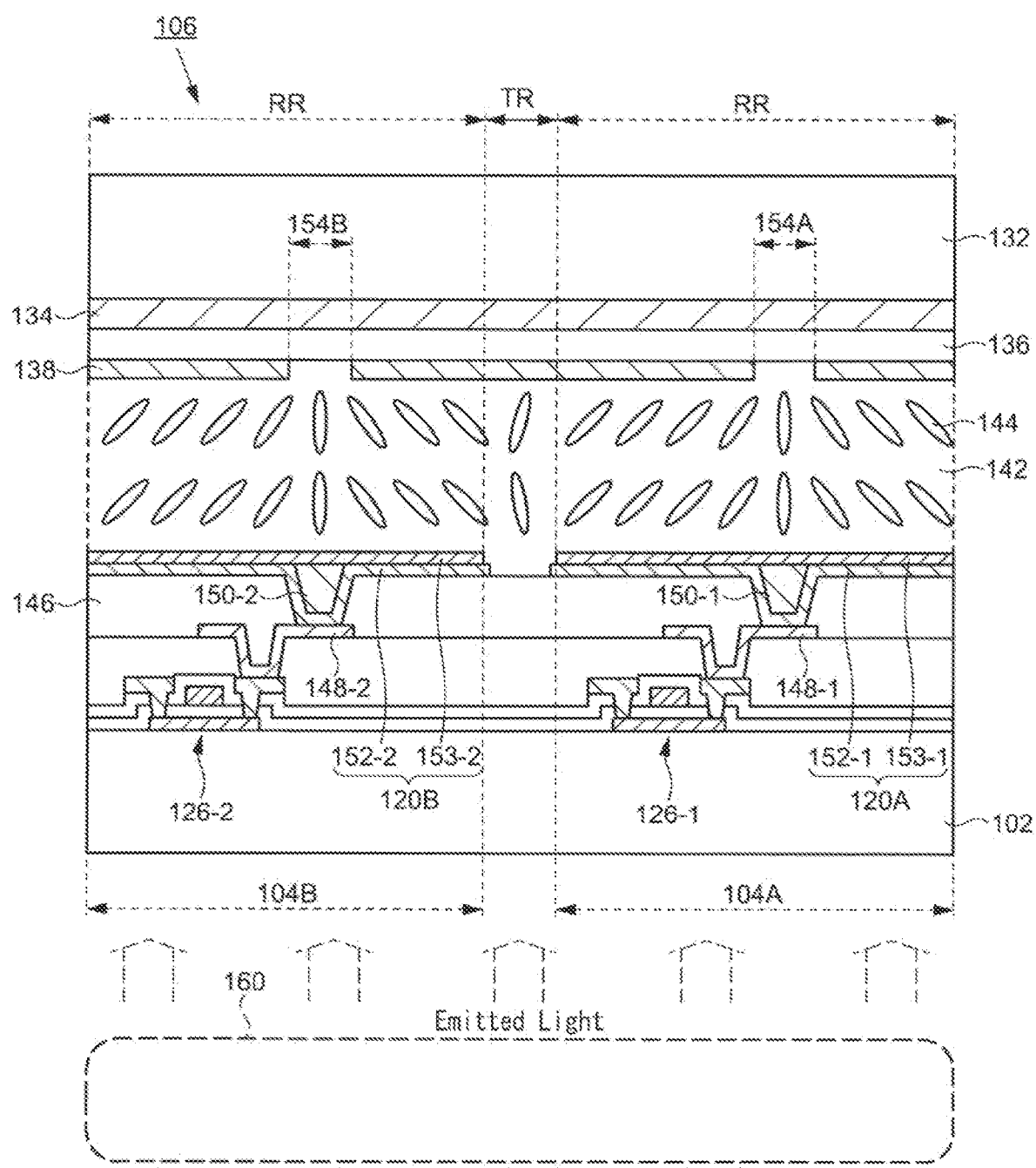
FIG. 3 is a partial cross-sectional view of a pixel array of a liquid crystal display device according to an embodiment of the present invention.

FIG. 3 shows the cross-sectional structure of the first pixel electrode 120A and the second pixel electrode 120B and the boundary of these electrodes as a partial cross-sectional structure of the pixel array 106 of the liquid crystal display device 100. The liquid crystal display device 100 includes the array substrate 102 and the opposing substrate 132. The array substrate 102 and the opposing substrate 132 are arranged to face each other with the liquid crystal layer 142 in between. FIG. 3 shows a structure in which the first pixel electrode 120A and the second pixel electrode 120B are arranged on the array substrate 102 and the counter electrode 138 is arranged on the counter substrate 132.

FIG. 3 also schematically shows a structure in which the first pixel electrode 120A is connected to the switching element 126-1 (corresponding to the second switching element 126B or the third switching element 126C shown in FIG. 2) and the second pixel electrode 120B is connected to the switching element 126-2. The first pixel electrode 120A and the second pixel electrode 120B are arranged on an insulating layer 146. The first pixel electrode 120A is connected to a connecting wiring 148-1 by a contact hole formed in the insulating layer 146, and the second pixel electrode 120B is connected to a connecting wiring 148-2 by a contact hole formed in the insulating layer 146. The connecting wiring 148-1 is an intermediate wiring that connects the switching element 126-1 to the first pixel electrode 120A, and the connecting wiring 148-2 is an intermediate wiring that connects the switching element 126-2 to the second pixel electrode 120B.

The fillers 150-1, 150-2 may be disposed on the first pixel electrode 120A and the second pixel electrode 120B to prevent the formation of steps at the contact holes formed in the insulating layer 146. The fillers 150-1, 150-2 can planarize the recesses formed by the contact holes and prevent orientation disorder of the liquid crystal molecules in this area.

The first and second pixel electrodes 120A, 120B are reflective electrodes and are formed by a metal film, while the reflective electrode may be formed by a plurality of conductive films of different materials. For example, the first pixel electrode 120A and the second pixel electrode 120B may be formed from the first conductive layers 152-1, 152-2 that are connected to the connecting wiring 148-1, 148-2 and the second conductive layers 153-1, 153-2, which are arranged on top of the first conductive layers 152-1, 152-2 to cover the fillers 150-1, 150-2. The first conductive layers 152-1, 152-2 are preferably formed of a transparent conductive material such as ITO (Indium Tin Oxide), and the second conductive layers 153-1, 153-2 are preferably formed of a light-reflective metal film such as aluminum. These materials can be combined to ensure a suitable electrical connection between the first pixel electrode 120A and the second pixel electrode 120B and the connecting wirings 148-1, 148-2, so that they can function as reflective electrodes. The structure of the first and second pixel electrodes 120A, 120B may align the edges of the second conductive layers 153-1, 153-2 with the edges of the first conductive layers 152-1, 152-2, or the edges of the upper second conductive layers 153-1, 153-2 may be set back from the edges of the lower first conductive layers 152-1, 152-2 as shown in FIG. 3.

A color filter layer 134, an overcoat layer 136, and the counter electrode 138 are arranged on the counter substrate 132. The counter electrode 138 is formed of a transparent conductive film such as ITO and has a size that extends over the entire pixel array 106. A first opening 154A is arranged in a region where the counter electrode 138 overlaps the first pixel electrode 120A, and a second opening 154B is arranged in a region where the counter electrode 138 overlaps the second pixel electrode 120B.

The first pixel electrode 120A and the second pixel electrode 120B are reflective electrodes and reflect external light incident from the opposing substrate 132. That is, the external light passes through the color filter layer 134, the transparent overcoat layer 136, the counter electrode 138, and the liquid crystal layer 142, and is reflected by the first pixel electrode 120A and the second pixel electrode 120B, and the reflected light is emitted from the counter substrate 132 following a reverse route from that of incident light. The presence or absence of reflected light and its intensity reflected from the opposing substrate 132 is controlled by the orientation state of the liquid crystal molecules 144 in the liquid crystal layer 142.

As shown in FIG. 3, the pixel array 106 includes a reflective region RR formed by the first pixel electrode 120A and the second pixel electrode 120B and a transmissive region TR between the first pixel electrode 120A and the second pixel electrode 120B. The transmissive region TR is defined as the region between the edge of the second conductive layer (metal film) 153-1, which makes up the first pixel electrode 120A, and the edge of the second conductive layer (metal film) 153-2, which makes up the second pixel electrode 120B. A backlight 160 is disposed on a back side of the array substrate 102 (opposite side of a surface on which the first pixel electrode 120A and the second pixel electrode 120B are arranged) in the liquid crystal display device 100. The liquid crystal display device 100 has the function of displaying images by means of reflective electrodes while emitting light from the backlight 160 through the transmissive region TR, which assists in the display luminance of the images. For example, it is difficult to display a bright image in dark areas using only the reflective mode, but combining this with the transmissive mode makes it possible to display images brighter.

The liquid crystal display device 100 according to this embodiment is not arranged with a light-shielding layer that hides the region between pixels. Therefore, it is also important to control the orientation of liquid crystal molecules in the transmissive region TR between the first pixel electrode 120A and the second pixel electrode 120B.

Although the alignment film is not shown in FIG. 3, the array substrate 102 and the opposing substrate 132 are disposed with a vertically oriented film. The vertical alignment film keeps the liquid crystal molecules 144 vertically oriented when no voltage is applied between the first pixel electrode 120A and the second pixel electrode 120B and the counter electrode 138. That is, a long axis of the liquid crystal molecules 144 is oriented such that it is standing perpendicular to the substrate surface of the array substrate 102. When a predetermined voltage is applied between the first pixel electrode 120A and the second pixel electrode 120B and the counter electrode 138, the long axis of the liquid crystal molecules 144 tilts from vertical to horizontal (transverse) and is oriented horizontally when the maximum voltage is applied. FIG. 3 schematically shows that since electric fields are not formed at the edges of the first opening 154A and second opening 154B in the counter electrode 138, the liquid crystal molecules at the regions overlapping these openings remain vertically oriented, while the liquid crystal molecules around these openings are obliquely oriented between the horizontally oriented liquid crystal molecules and those that remain vertically oriented.

Figure 4:
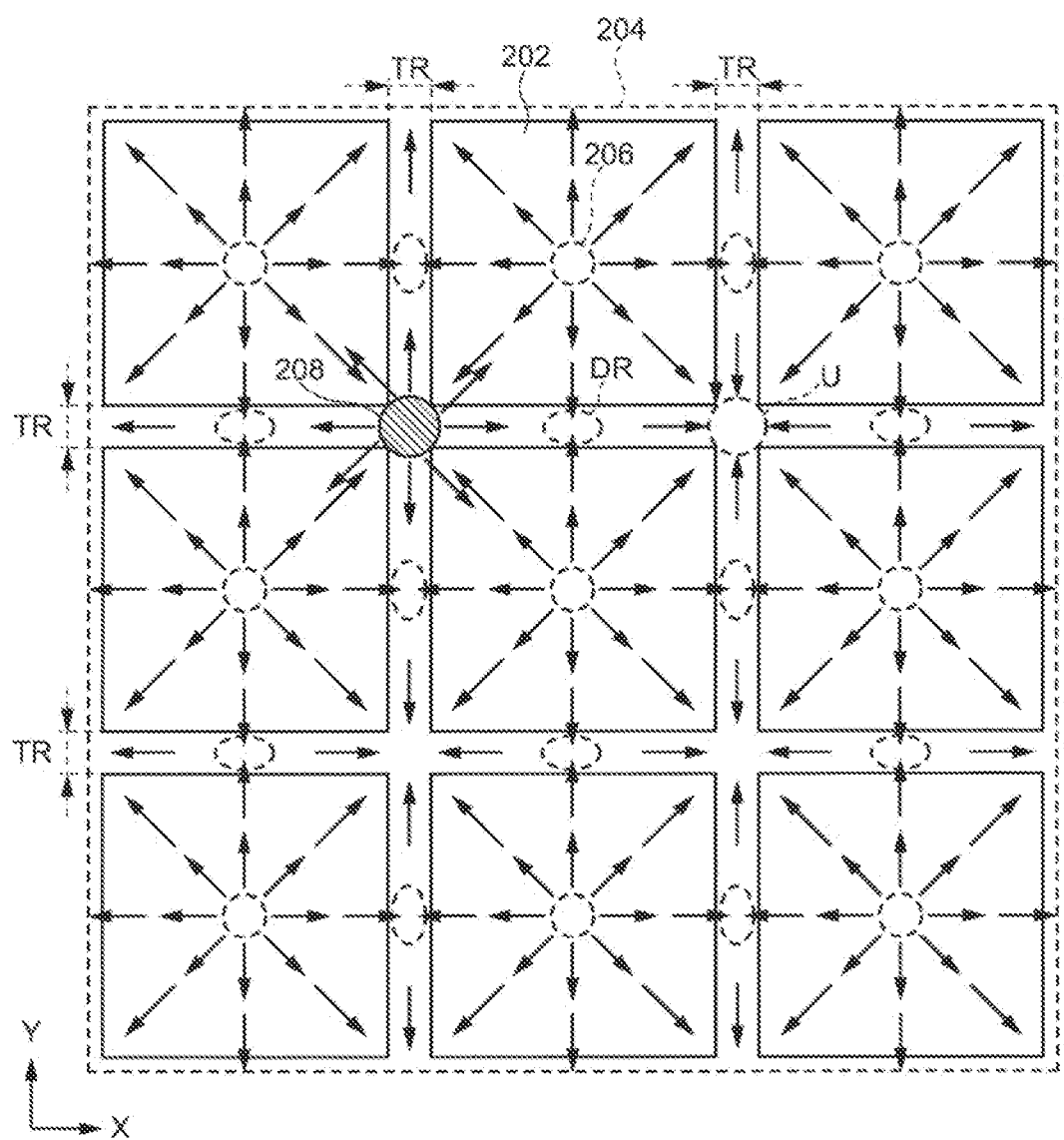
FIG. 4 is a plan view illustrating a structure and arrangement of pixel electrodes of a liquid crystal display device and an orientation of liquid crystal molecules.

FIG. 4 shows a planar schematic diagram of a pixel array as a comparative example in which a plurality of pixel electrodes 202 are arranged in a matrix in the X-axis and Y-axis directions shown in the figure. The pixel electrode 202 shown in FIG. 4 is square in a plan view. The dotted circle overlapping the pixel electrode 202 indicates the openings 206 of the counter electrode 204. FIG. 4 shows an arrangement in which a spacer 208 is disposed in the region surrounded by the four pixel electrodes 202.

FIG. 4 shows the direction of orientation of liquid crystal molecules at each location by arrows, with an electric field formed between the pixel electrode and the counter electrode. As shown in FIG. 3, the liquid crystal molecules are oriented radially around the openings 206 when a potential difference is generated between the pixel electrode 202 and the counter electrode 204. The liquid crystal molecules are oriented radially on the pixel electrode 202, but in the region between the pixel electrodes, the liquid crystal molecules oriented from both sides interfere with each other, resulting in an unstable orientation state. As a result, as shown in FIG. 4, the region DR near the center of one side of the pixel electrode 202 and between the neighboring pixel electrodes 202 is a region that induces orientation disorder (disclination) of the liquid crystal molecules. As shown in FIG. 4, the regions DR are generated between the pixel electrodes arrayed in a matrix-like pattern, and if this orientation disorder occurs in many regions DR, it may be visible to the user as a display irregularity on the entire screen.

On the other hand, in the region U surrounded by the edges of the four pixel electrodes 202, the liquid crystal molecules are equally oriented from four or eight directions, and since the electric field is not generated in this region, the orientation state is relatively stable. The orientation of liquid crystal molecules is controlled by the effect of the spacer 208 in the region where the spacer 208 is disposed, and the disclination is less likely to occur. While the region DR is affected by the liquid crystal molecules oriented on each electrode, it is at a distance from the region U, where the orientation of the liquid crystal molecules is stable, when viewed at the level of the liquid crystal molecules, and these are the factors causing the unstable orientation state.

The liquid crystal display device 100 according to this embodiment is used for displaying images, with the region between pixels acting as the transmissive region TR. If disclination occurs in the regions DR as shown in FIG. 4, the image quality may be adversely affected. It is possible to prevent the formation of disclination and suppress the degradation of image quality when the liquid crystal display device 100 is arranged with the configuration of pixel electrodes shown in the following embodiments.

First Embodiment

Figure 5:
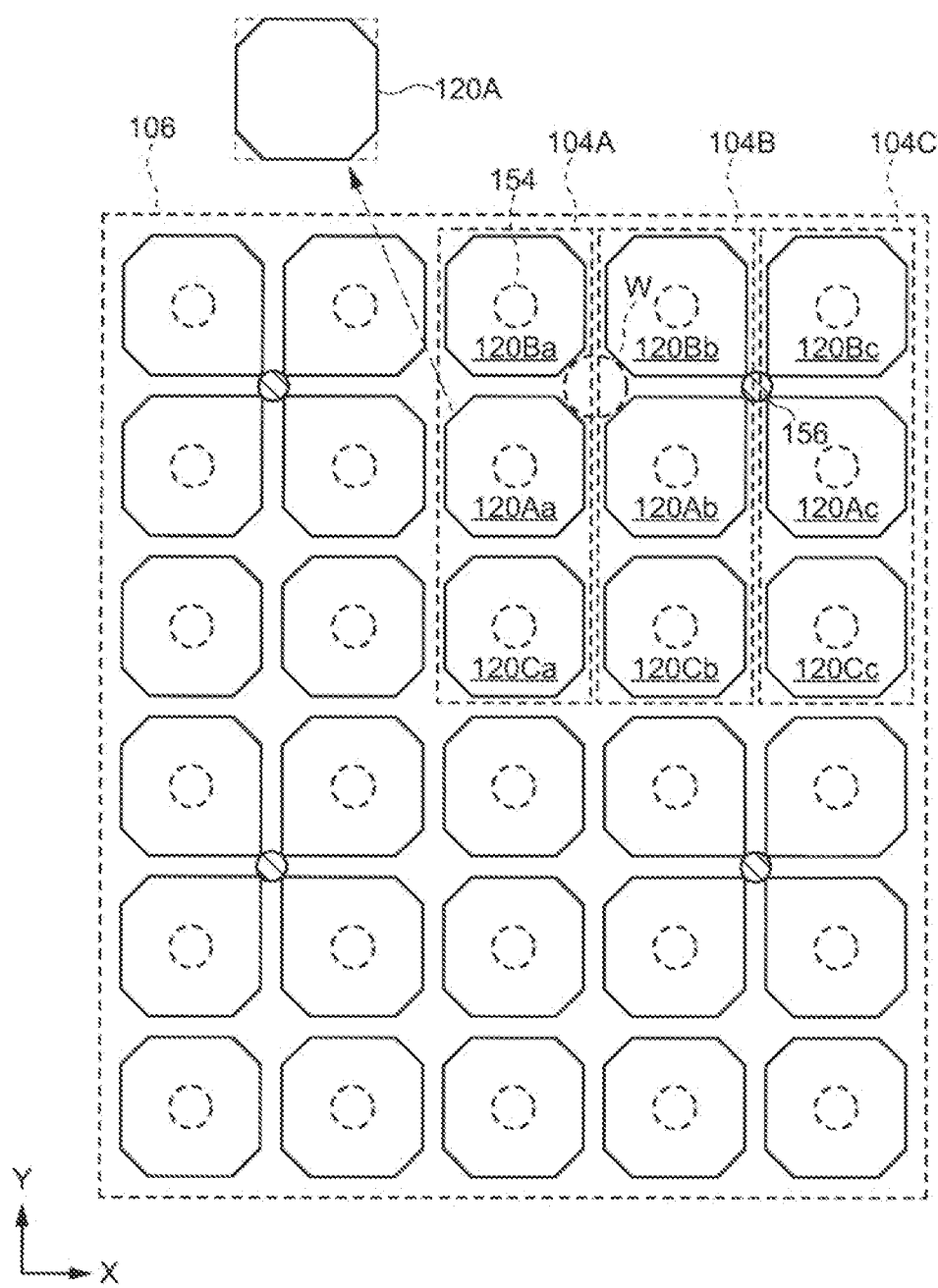
FIG. 5 is a plan view of a pixel array of a liquid crystal display device according to an embodiment of the present invention.

FIG. 5 is a plan view showing the configuration of pixel array 106. FIG. 5 shows an arrangement in which the pixel 104 includes three sub-pixels, and the first pixel electrode 120A, the second pixel electrode 120B, and the third pixel electrode 120C are arranged correspondingly. The pixel 104 includes the first pixel circuit 122A and the second pixel circuit 122B shown in FIG. 2. The first pixel electrode 120A is sandwiched between the second pixel electrode 120B and the third pixel electrode 120C.

As shown in FIG. 5, the first pixel electrode 120A has a shape in which three or four corners are notched in relation to the square shape shown in FIG. 4. Since the corners of the first pixel electrode 120A have a notched shape, the length of one side is shorter than in the square shape. Such a shape can be otherwise expressed as a shape in which, the corners of the pixel electrodes concerned are brought closer to the center of each side in comparison with a virtual square formed by extending the sides parallel to the array direction of the pixel electrodes in each pixel electrode. The pixel array 106 is a matrix array of pixel electrodes of such shapes in the X-axis and Y-axis directions shown in the figure.

As shown in FIG. 5, the first pixel electrode 120Aa, the second pixel electrode 120Ba, and the third pixel electrode 120Ca arranged in the first sub-pixel 104A all have a shape in which the corners are notched. In other words, the pixel electrodes arranged in the sub-pixel have a shape including an end notch (cutoff corner). The first pixel electrode 120Ab, second pixel electrode 120Bb, and third pixel electrode 120Cb arranged in the second sub-pixel 104B, and the first pixel electrode 120Ac, second pixel electrode 120Bc, and third pixel electrode 120Cc arranged in the third sub-pixel 104C also have similar shapes. Accordingly, the spacing (gap) in the region W surrounded by the first pixel electrode 120Aa, the first pixel electrode 120Ab, the second pixel electrode 120Ba, and the second pixel electrode 120Bb is much wider than in the region U shown in FIG. 4. FIG. 5 also shows the arrangement of the spacer 156 in the region between pixels surrounded by the first pixel electrode 120Ab, the first pixel electrode 120Ac, the second pixel electrode 120Bc, and the second pixel electrode 120Bc. The corners of the first pixel electrode 120Ab, the first pixel electrode 120Ac, the second pixel electrode 120Bc, and the second pixel electrode 120Bc that surround the spacer 156 are not notched on the spacer 156 side, and each corner is shaped to protrude toward the spacer 156.

Figure 6:
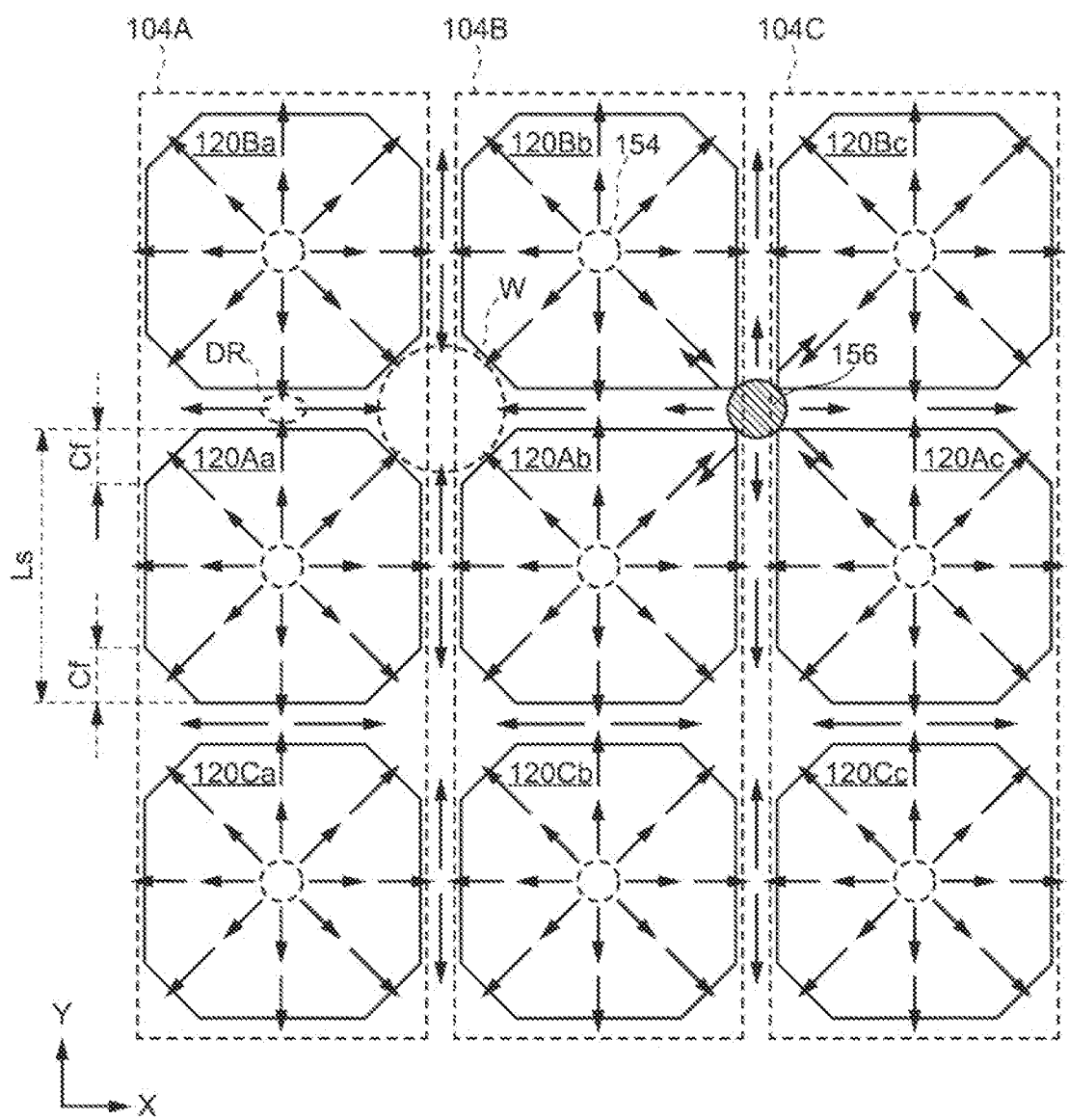
FIG. 6 is a plan view illustrating a structure and arrangement of pixel electrodes and an orientation of liquid crystal molecules in a liquid crystal display device according to an embodiment of the present invention.

FIG. 6 schematically shows the orientation of the liquid crystal molecules during the formation of the electric field in the pixel array 106 shown in FIG. 5 by means of arrows. As described with reference to FIG. 4, the liquid crystal molecules are oriented radially with the opening 154 in the counter electrode 138 as the center. At the region DR where the edges of the pixel electrodes 120 are adjacent to each other, the liquid crystal molecules are oriented so that they collide from both sides, as in the example shown in FIG. 4. However, as shown in FIG. 6, since the region W surrounded by the first pixel electrode 120Aa, the first pixel electrode 120Ab, the second pixel electrode 120Ba, and the second pixel electrode 120Bb, except for the position where the spacer 156 is installed, the regions DR are close to the region W. The region U shown in FIG. 4 is basically a region where disclination does not occur, and the same can be said for the region W, which can be considered as an enlarged version of the region U. As shown in FIG. 6, the distance between the region W and the regions DR is smaller than the distance between the region U and the regions DR shown in FIG. 4. In this way, when there is an area (region W in the present embodiment) where the arrangement of the liquid crystal molecular is stable, the liquid crystal molecules around the area will increase their stability due to the influence of the liquid crystal molecules in the region W. As a result, the instability of the liquid crystal molecules can be resolved and the occurrence of disclination can be suppressed.

As shown in FIG. 6, it is preferable that the length Cf of the notched corner of the first pixel electrode 120Aa be ⅕ to ¼ of the length of one side Ls when the corner is not notched. This notched length Cf is the same for the other pixel electrodes 120. If the notch is larger than the above range, an area of the pixel electrode 120 will be reduced and the display luminance in a reflective mode will be greatly reduced. If the notch is smaller than the above range by too much, it is not desirable because the effect of suppressing the disclination will be less effective.

On the other hand, there is no need to form the notched corners in the region where the spacer 156 shown in FIG. 6 is arranged since the orientation of the liquid crystal molecules is regulated by the spacer 156, as explained with reference to FIG. 4. Therefore, as shown in FIG. 5 and FIG. 6, the pixel array 106 can include regions where the spacing (the gap) between edges of the pixel electrodes diagonally facing each other (regions where the corners of the pixel electrodes are notched) is wide and regions where the spacing between edges of the pixel electrodes diagonally facing each other (regions where spacers are arranged) is relatively narrow.

As shown in this embodiment, it is possible to suppress the disclination that occurs in the inter-pixel region where the pixel electrodes 120 are adjacent to each other vertically or horizontally by widening the spacing between the ends of the four pixel electrodes 120 diagonally facing each other. Specifically, it is possible to increase the spacing between the edges of the four pixel electrodes 120 by notching the corners of the pixel electrodes 120, thereby suppressing the occurrence of disclination. As a result, orientation disorder of liquid crystal molecules can be suppressed in the region between pixels that are displayed in a transmissive mode, and the degradation of picture quality can be reduced.

The liquid crystal display device 100 according to this embodiment includes memory circuits (latch circuit 124) that store data signals in the sub-pixels 104, and can display images based on the data signals stored in the memory circuits. The sub-pixel 104 includes three pixel electrodes (first sub-pixel 105A, second sub-pixel 105B, and third sub-pixel 105C) which are formed of reflective electrodes, and the gradation is expressed by area gradation using these reflective electrodes. The liquid crystal display device 100 according to this embodiment can be combined with the display of images not only in the reflective mode but also in the transmissive mode, in which the region between sub-pixels is used as the transmissive region TR to transmit the light of the backlight 160. In this case, as shown in FIG. 5, an area of the transmissive region TR can be expanded by notching the corners of each pixel electrode 120 so that the distance between the edges of the diagonally facing pixel electrodes 120 widens, thereby increasing the luminance of the displayed image. As shown in FIG. 3, it is preferable that the elements, wiring, etc. that form the pixel circuit are arranged on the lower layer of the pixel electrodes, and that these elements are laid out so that they do not overlap the transmissive region TR as much as possible. Such a layout, in addition to notching the corners of the pixel electrodes, can expand the real area of the transmissive region TR, thus increasing the brightness of the display in the transmissive mode.

Second Embodiment

The shape of the pixel electrodes is not limited to the shape shown in the first embodiment, and may have other different shapes as long as the spacing between diagonally facing pixel electrodes is widened. This embodiment shows an example in which the shape of the pixel electrodes differs from the first embodiment. In the following explanation, the focus will be on the portions that differ from the first embodiment.

Figure 7:
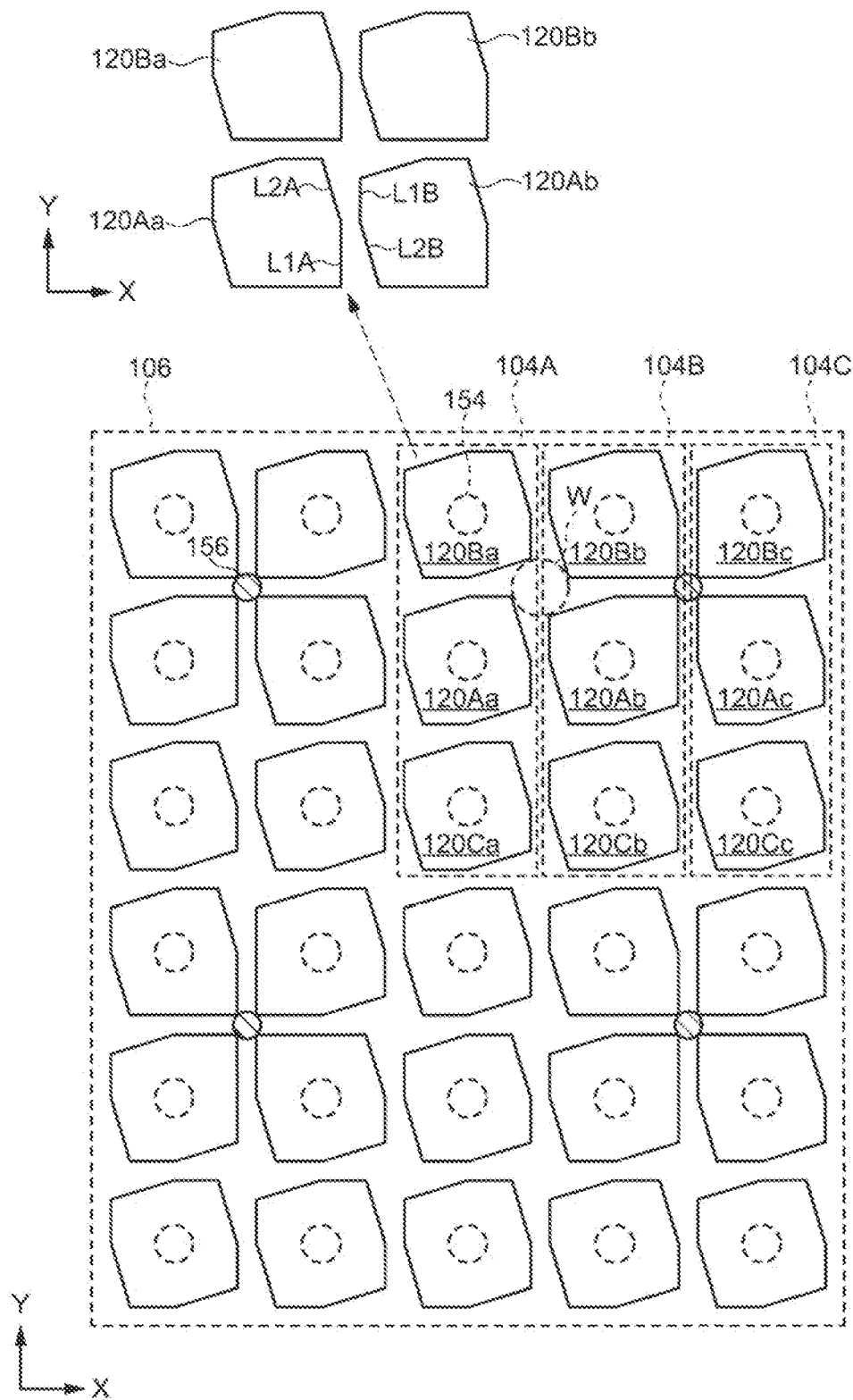
FIG. 7 is a plan view of a pixel array of a liquid crystal display device according to an embodiment of the present invention.

FIG. 7 is a plan view of the arrangement of the pixel electrodes of the pixel array 106 in this embodiment. The pixel array 106 includes a first sub-pixel 104A, a second sub-pixel 104B, and a third sub-pixel 104C. The first sub-pixel 104A includes a first pixel electrode 120Aa, a second pixel electrode 120Ba, and a third pixel electrode 120Bc. The second sub-pixel 104B and the third sub-pixel 104C have the same configuration. As shown in FIG. 7, a shape of the first pixel electrode 120Ab is asymmetric with respect to the second pixel electrode 120Bb and the second pixel electrode 120Cb, which are adjacent to the top and bottom, and with respect to the first pixel electrode 120Aa and the first pixel electrode 120Ca, which are arranged on the left and right. While the shape of each pixel electrode has this asymmetric relationship, the region where the spacer 156 is not disposed is similar to the extended region W shown in FIG. 6 where the spacing (gap) between the edges of the four diagonally facing pixel electrodes (for example, first pixel electrode 120Aa, first pixel electrode 120Ab, second pixel electrode 120Ab, second pixel electrode 120Bb) is wider than that of when rectangular pixel electrodes are arranged at the same pitch. Furthermore, the shape of the pixel electrodes in itself may be horizontally or/and vertically asymmetrical.

As shown in the inset of FIG. 7, one side of the first pixel electrode 120Aa has one portion L2 that bends away from the edge of the adjacent second pixel electrode 120B from the middle of one portion L1 that extends in a straight line. That is, the first pixel electrode 120Aa has a first portion (L1A) parallel to the Y-axis direction and a second portion (L2A) intersecting the Y-axis and X-axis directions. The first pixel 120Ab adjacent to the first pixel electrode 120Aa has a first portion (L1B) parallel to the Y-axis direction and a second portion (L2B) intersecting the Y-axis and X-axis directions. The first pixel electrode 120Aa and the second pixel electrode 120Ab are arranged so that the first portion (L1A) and the second portion (L2A) of the outer peripheral edges are adjacent to each other in the X-axis direction and the second portion (L2B) and the first portion (L1B) are adjacent to each other in the X-axis direction. The first portion (L1A) and second portion (L2B), whose outer edges are adjacent to each other, are non-parallel, and the second portion (L2A) and first portion (L1B) are parallel. In other words, each edge forming the contour of the first pixel electrode 120Aa does not extend in a straight line from one end to the other, but has a contour shape that bends in the middle of the straight portion and is non-parallel to a side of the adjacent first pixel electrode 120Ab. Such a shape and arrangement are the same for the second pixel electrode 120Ba and the third pixel electrode 120Ca.

Similar to the pixel electrodes shown in the first embodiment, the edges of the pixel electrodes adjacent to the spacer 156 do not have an odd shape, and the corners of each pixel electrode protrude toward the spacer 156.

According to the pixel electrode shape shown in FIG. 7, it is possible to widen the distance between the diagonally opposite edges of the four pixel electrodes. As a result, as in the first embodiment, it is possible to prevent the disclination that occurs in the region between pixels where the pixel electrodes are adjacent to each other vertically or horizontally. As a result, orientation disorder of liquid crystal molecules can be prevented in the region between pixels that are displayed in a transmissive mode, the degradation of picture quality can be reduced, and the picture quality can be improved.

Third Embodiment

This embodiment shows an example of a pixel electrode with a shape different from the first embodiment and the second embodiment.

Figure 8:
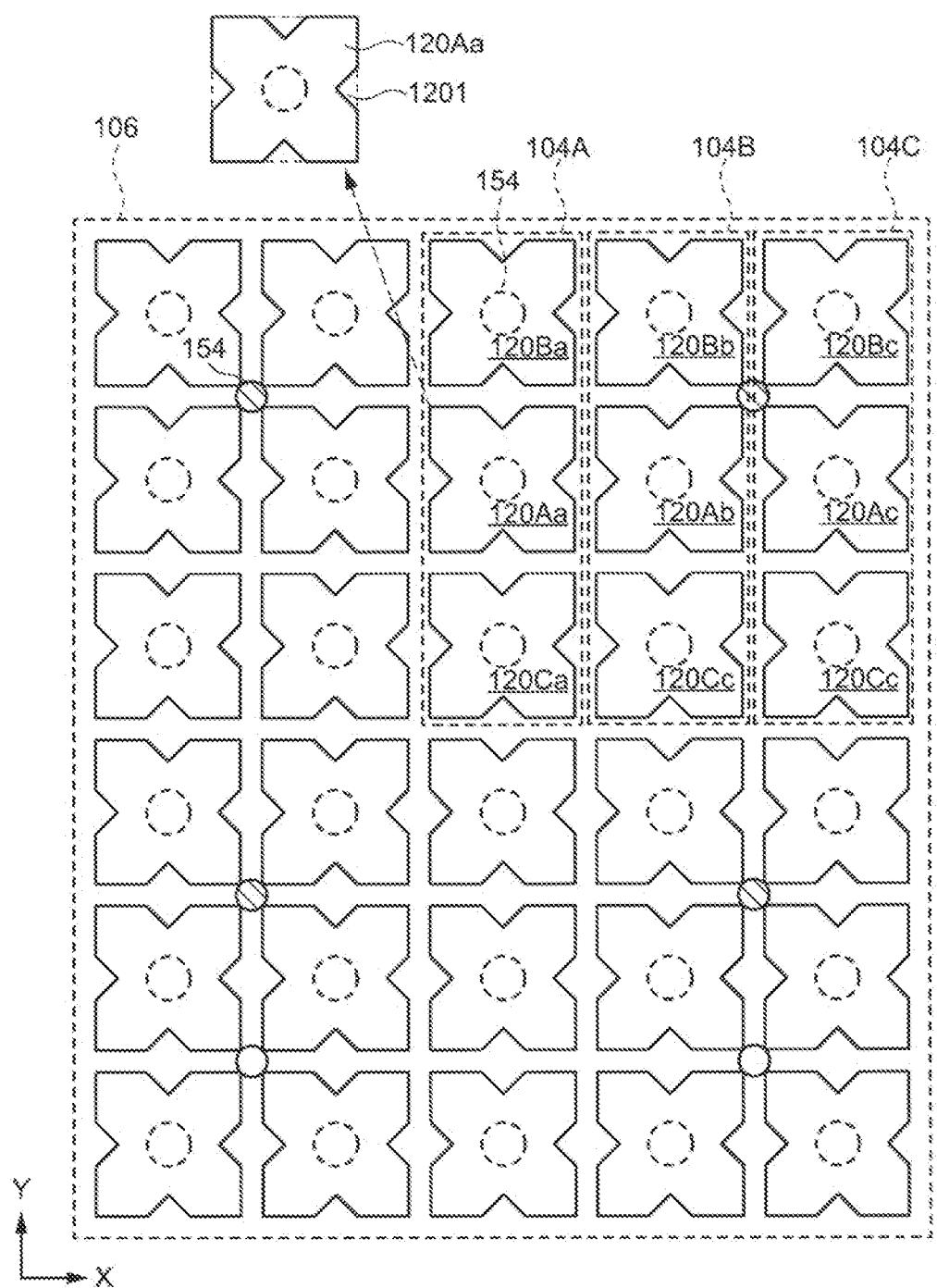
FIG. 8 is a plan view of a pixel array of a liquid crystal display device according to an embodiment of the present invention.

FIG. 8 is a plan view of the arrangement of pixel electrodes of the pixel array 106 in this embodiment. The pixel array 106 includes a first sub-pixel 104A, a second sub-pixel 104B, and a third sub-pixel 104C. The first sub-pixel 104A includes a first pixel electrode 120Aa, a second pixel electrode 120Ba, and a third pixel electrode 120Ca. The second sub-pixel 104B and the third sub-pixel 104C have similar pixel electrode configurations. As shown in FIG. 8, the first pixel electrode 120Aa has a shape of a rectangle (for example, a square) with a notch 1201 in the central portion of each side. In other words, the first pixel electrode 120Aa according to this embodiment has at least one side adjacent to the neighboring pixel electrode (for example, the second pixel electrode 120Ba), and the center of one of the sides has an outer edge that bends towards the inner side of the first pixel electrode 120Aa. The second pixel electrode 120Ba and the third pixel electrode 120Ca have similar shapes.

As explained with reference to FIG. 4, the disclination occurs in the center of the inter-electrode region sandwiched between one side of the pixel electrode and one side of the adjacent pixel electrode (region DR). Each pixel electrode 120 shown in FIG. 8 has a notch 1201 in the center of each side, which contributes to form a region where the electric field is not generated or is significantly small in the center, that makes the orientation of the liquid crystal molecules stable in the region, and the orientation of the liquid crystal molecules around the region relatively stable as well. As a result, the orientation of liquid crystal molecules in the same position as the region DR shown in FIG. 4 is stabilized and the occurrence of disclination is prevented as much as possible. In other words, it is possible to form a region that approximates the region where the pixel electrodes face each other diagonally (for example, region W shown in FIG. 6) by arranging the notch in the center of each side of the rectangular pixel electrode shown by the dotted line in FIG. 8, and the occurrence of disclination is reduced.

Although FIG. 8 shows a structure in which notches 1201 are formed on each opposing side between adjacent pixel electrodes, the notches 1201 may be formed only on one of the opposing sides.

According to the shape of the pixel electrodes shown in FIG. 8, even if disclination occurs in the region between the pixel electrodes, the region where it occurs can be fixed and the orientation of the liquid crystal molecules can be stabilized. As a result, orientation disorder (fluctuation) of liquid crystal molecules can be prevented even in the region between pixels that are displayed in a transmissive mode, and the degradation of image quality can be prevented, thereby improving the image quality.

Fourth Embodiment

This embodiment differs from the first to third embodiments in that the form of the counter electrode is different.

Figure 9:
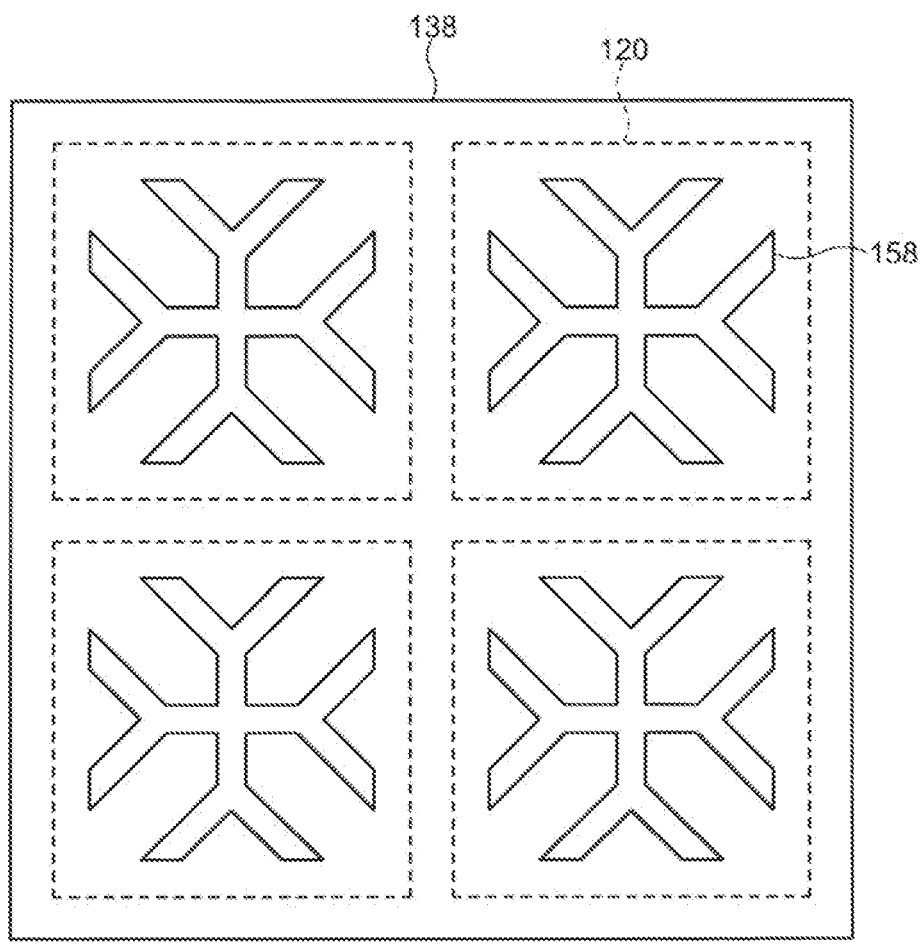
FIG. 9 is a plan view of a counter electrode in a liquid crystal display device according to an embodiment of the present invention.

FIG. 9 shows a plan view of the counter electrode 138 of the liquid crystal display according to this embodiment. As shown in FIG. 9, the counter electrode 138 is arranged to overlap the pixel electrodes 120. The counter electrode 138 is arranged with slits 158 in the region overlapping the pixel electrodes 120. The slit 158 has a shape extending outward from a center portion of the region overlapping the pixel electrode 120 in a plan view. When the pixel electrode 120 is square, the slit 158 has a cross shape so that it extends toward each side of the pixel electrode 120. Further, the slit 158 has a shape in which the tip of the cross shape is bifurcated into two. In other words, the slit 158 has the shape of a Y-shaped pattern that extends outward from the center of the region overlapping the pixel electrode 120 and is combined to connect at the center.

The liquid crystal molecules change orientation according to the intensity of the electric field between the pixel electrode 120 and the counter electrode 138. Although the counter electrode 138 has a shape that extends over the entire pixel array 106, an opening (a slit in this embodiment) is arranged in the region overlapping the pixel electrode 120, so that the electric field is concentrated at the periphery of the slit 158. The slit 158 shown in FIG. 9 extends to a region where the tip extends toward the outer edge of the pixel electrode 120 (the center of one side), allowing the region where the orientation of the liquid crystal molecules is stable to be formed near the center of each side, rather than in the center of the pixel electrode 120.

A region is formed where the orientation of the liquid crystal molecules is stable in the vicinity of the region between pixels, thereby preventing the occurrence of disclination, by arranging the counter electrode 138 with the slit 158 having such a shape. As a result, orientation disorder (fluctuation) of liquid crystal molecules is reduced even in the region between pixels that are displayed in a transmissive mode, which can prevent the degradation of image quality and improve the image quality. In addition, the slit 158 has the shape extending in multiple directions from the center, which allows the liquid crystal molecules to be oriented in each direction, which also improves the viewing angle.

The shape of the slit 158 shown in FIG. 9 is an example and is not limited to the shape shown in the figure. The slit may have other shapes as long as it is capable of forming a region where the electric field is concentrated in the central region of the outer edge of the pixel electrode.

Each embodiment described above as embodiments of the present invention may be combined as appropriate to the extent that they do not contradict each other. Based on the liquid crystal display device of each embodiment, any addition, deletion, or design change of components, or any addition, omission, or change of conditions of processes made by a person skilled in the art as appropriate, is also included in the scope of the invention as long as it has the gist of the invention.

Other advantageous effects different from the advantageous effects provided by each of the embodiments described above, which are obvious from the description herein or which can be easily foreseen by those skilled in the art, are naturally considered to be provided by the present invention.

What is claimed is:

1. A liquid crystal display device, comprising:
an array substrate including a pixel array with a plurality of pixel electrodes arranged in a matrix;
a counter substrate including a counter electrode opposed to the array substrate and overlapping the plurality of pixel electrodes; and
a spacer between the array substrate and the counter substrate,
wherein:
the counter electrode has openings in regions overlapping each of the pixel electrodes,
the plurality of pixel electrodes includes a first group having four pixel electrodes that are directly adjacent to each other and disposed in two rows and two columns, and a second group having four pixel electrodes that are directly adjacent to each other and disposed in two rows and two columns,
a first spacing surrounded by the first group of four pixel electrodes is wider than a second spacing surrounded by the second group of four pixel electrodes,
the spacer is located in the second spacing and is not located in the first spacing,
a corner of each of the four electrodes in the first group has a cut-off shape, and
the cut-off shapes face the first spacing.

2. The liquid crystal display device according to claim 1, wherein each pixel electrode of the first group has a rectangular shape with three or four corners having the cut-off shape in a plan view.

3. The liquid crystal display device according to claim 1, wherein:
each of sides of the plurality of pixel electrodes has a first portion parallel to an X direction or Y direction crossing the X direction and a second portion intersecting the X direction and Y direction,
the first portion of a first pixel electrode in the plurality of pixel electrodes faces the second portion of a second pixel electrode adjacent to the first pixel electrode, and
the second portion of the first pixel electrode faces the first portion of the second pixel electrode.

4. The liquid crystal display device according to claim 1, wherein the plurality of pixel electrodes are each a reflective electrode, and a transmissive region is located between the pixel electrodes.

5. The liquid crystal display device according to claim 4, further comprising a backlight,
wherein light from the backlight is emitted through the transmissive region.

6. The liquid crystal display device according to claim 1, wherein:
the pixel array includes a pixel circuit including a latch circuit in each pixel, and
the pixel circuit is located in a region overlapping the pixel electrode.

7. A liquid crystal display device, comprising:
an array substrate including a pixel array with a plurality of pixel electrodes arranged in a matrix;
a counter substrate including a counter electrode opposed to the array substrate and overlapping the plurality of pixel electrodes; and
a spacer between the array substrate and the counter substrate,
wherein:
the counter electrode has openings in regions overlapping each of the pixel electrodes,
the plurality of pixel electrodes includes a first group having four pixel electrodes that are directly adjacent to each other and disposed in two rows and two columns, and a second group having four pixel electrodes that are directly adjacent to each other and disposed in two rows and two columns,
a first spacing surrounded by the first group of four pixel electrodes is wider than a second spacing surrounded by the second group of four pixel electrodes,
the spacer is located in the second spacing and is not located in the first spacing,
a first corner shape of each of the four electrodes in the first group is different from a second corner shape of each of the four electrodes in the second group,
the first corner shape faces the first spacing, and
the second corner shape faces the second spacing.

* * * * *